Aug. 3, 1954 W. M. SPRENG 2,685,476
VARIABLE DISCHARGE BLOWER
Filed Dec. 7, 1951 5 Sheets-Sheet 1
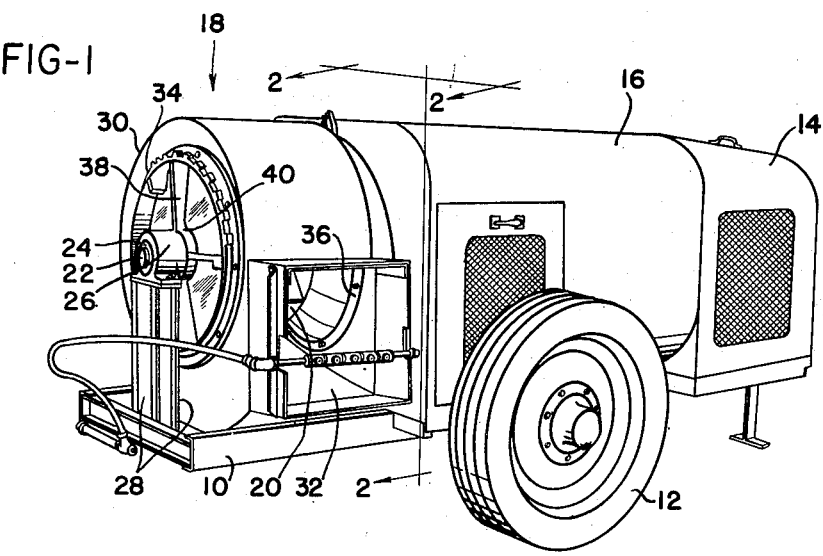
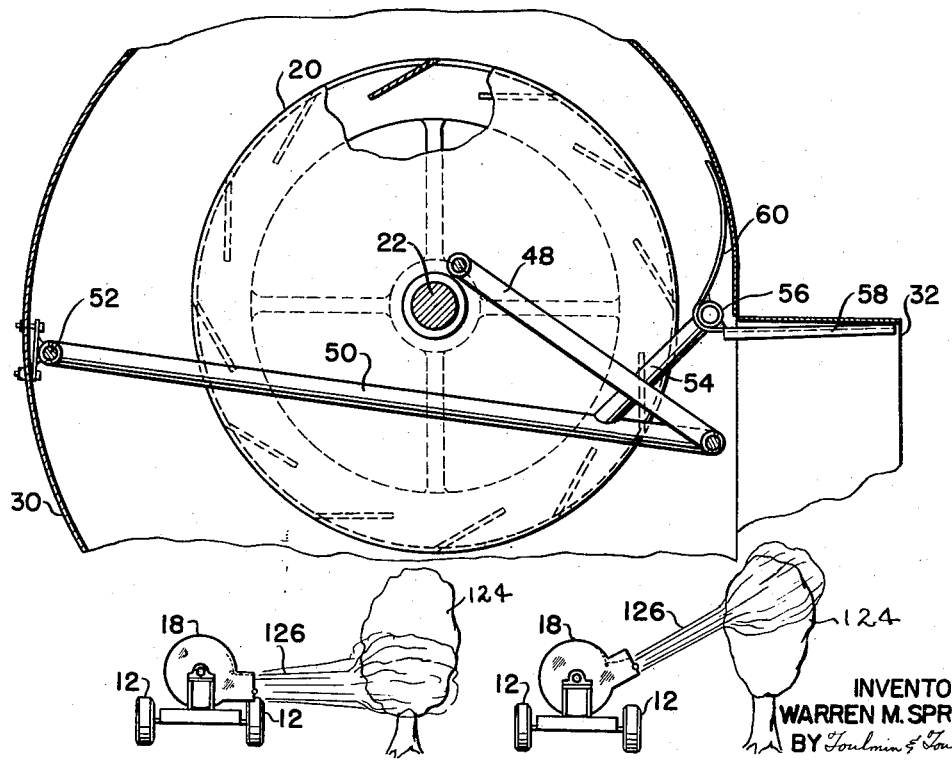
INVENTOR
WARREN M. SPRENG
BY Toulmin & Toulmin
ATTORNEYS Aug. 3, 1954 W. M. SPRENG 2,685,476
VARIABLE DISCHARGE BLOWER
Filed Dec. 7, 1951 5 Sheets-Sheet 2
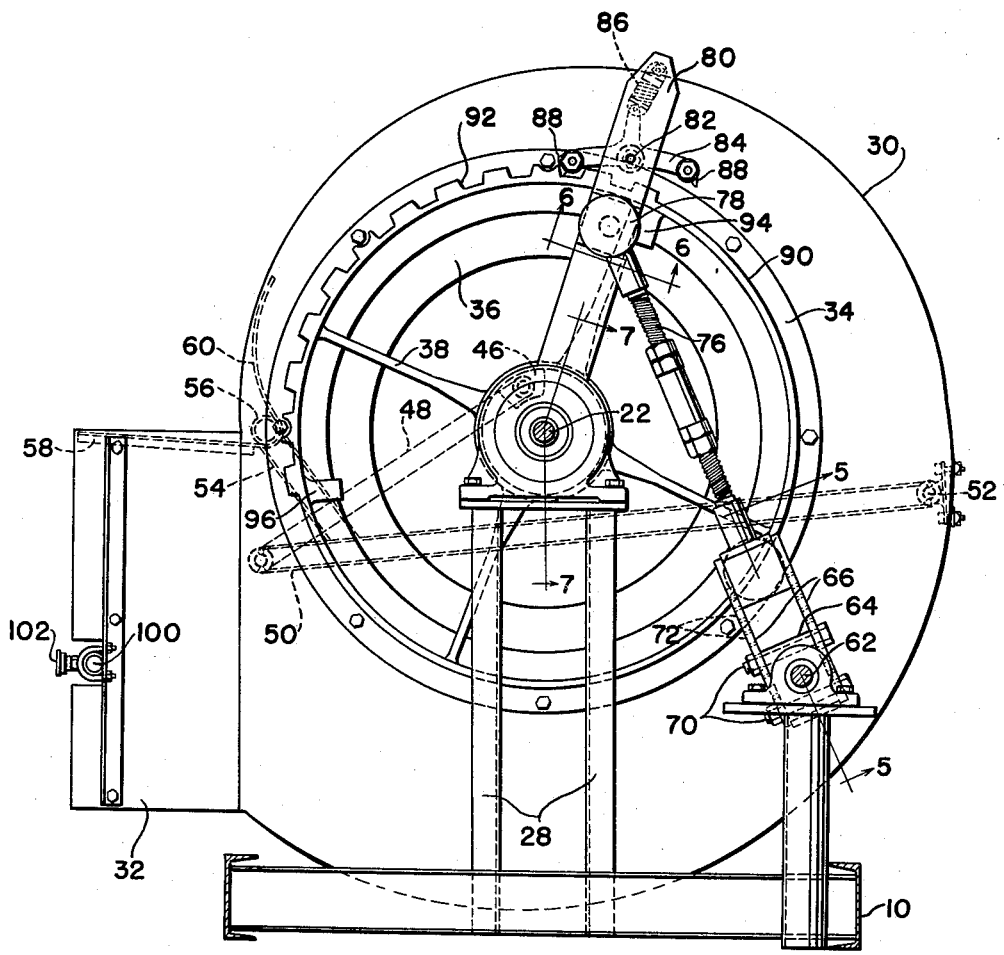
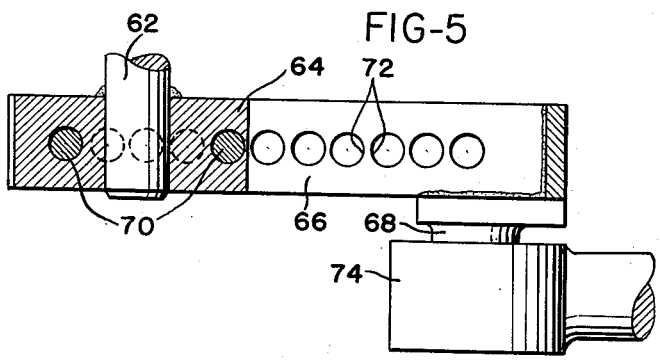
INVENTOR
WARREN M. SPRENG
BY Toulmin & Toulmin
ATTORNEYS

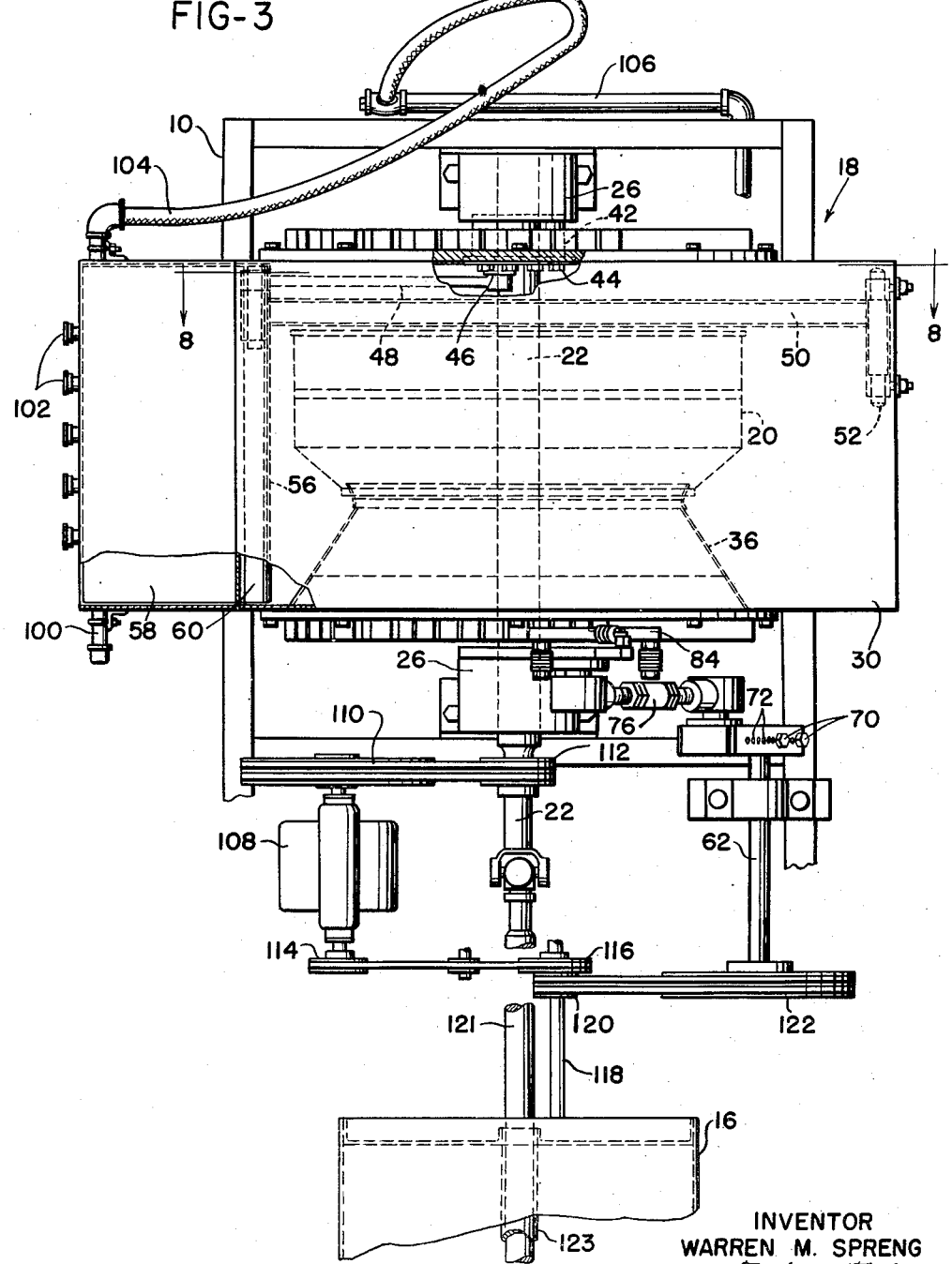

Aug. 3, 1954   W. M. SPRENG   2,685,476
VARIABLE DISCHARGE BLOWER
Filed Dec. 7, 1951   5 Sheets-Sheet 4
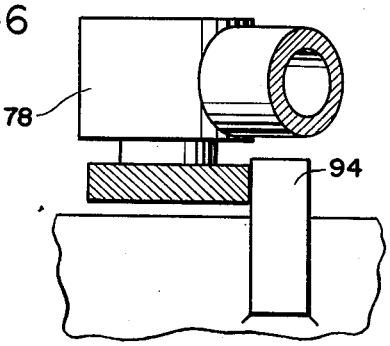
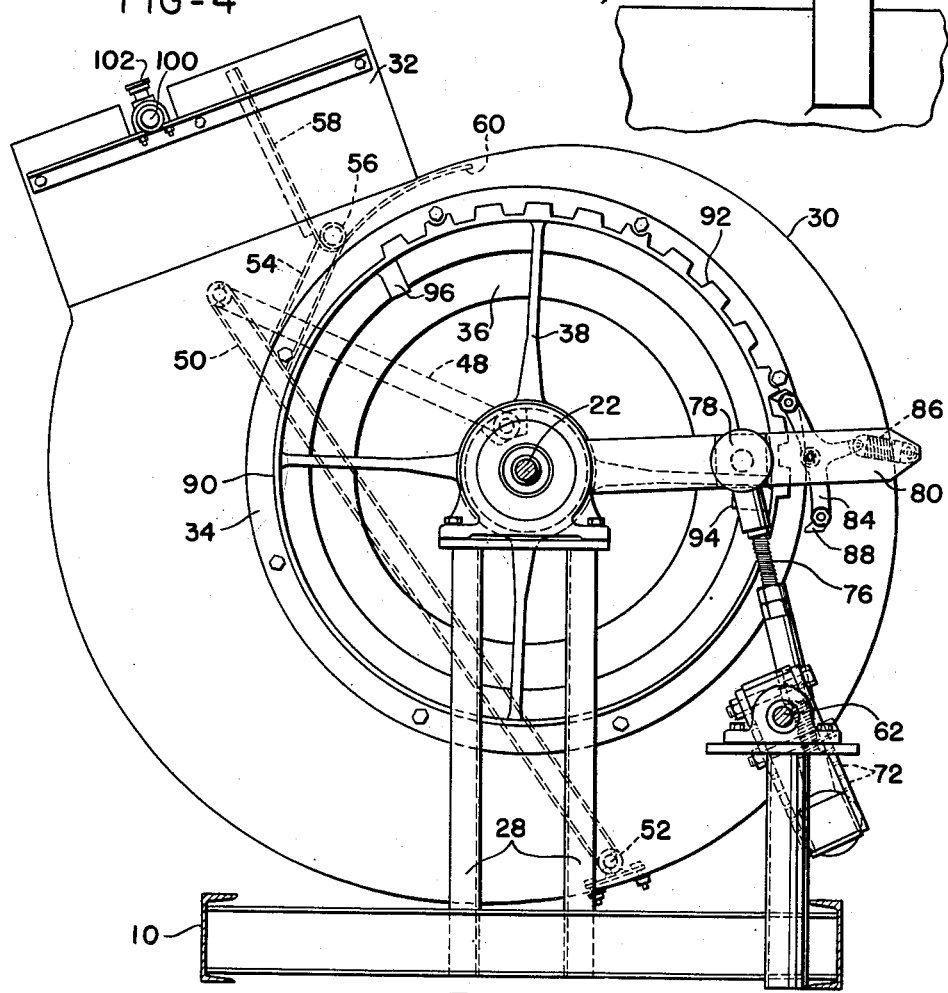
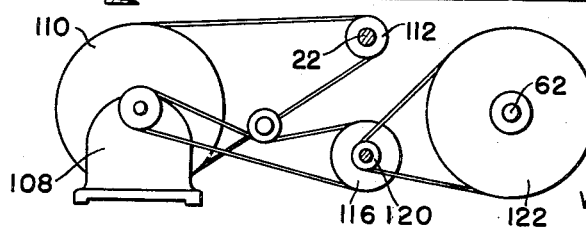
INVENTOR
WARREN M. SPRENG
BY *Toulmin & Toulmin*
ATTORNEYS

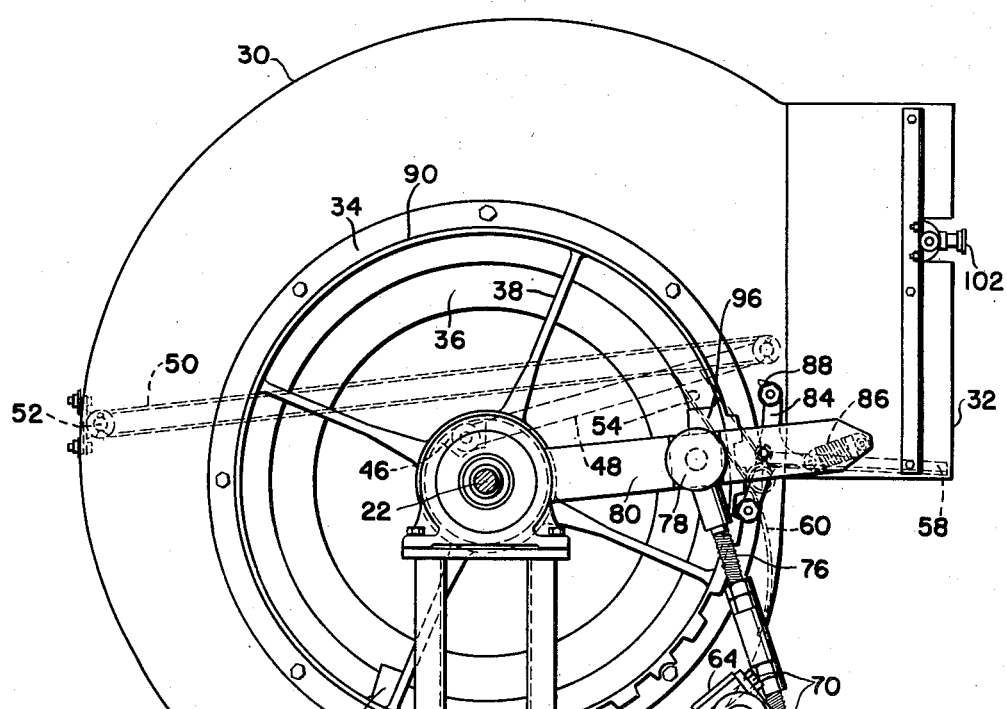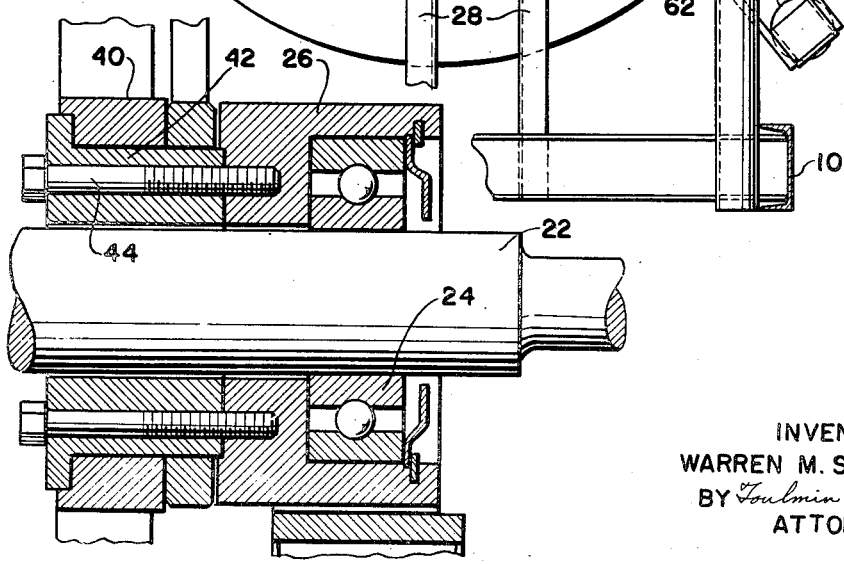

Patented Aug. 3, 1954

2,685,476

UNITED STATES PATENT OFFICE 2,685,476

VARIABLE DISCHARGE BLOWER

Warren M. Spreng, Ashland, Ohio, assignor to The F. E. Myers & Bro. Company, Ashland, Ohio, a corporation of Ohio Application December 7, 1951, Serial No. 260,366

14 Claims. (Cl. 299—41)

This invention relates to a blower, particularly a blower for dispensing insecticides and the like, and especially to a blower of this nature which oscillates in a vertical plane.

In my co-pending applications, Serial No. 640,072, filed January 9, 1946, now Patent No. 2,583,753, and Serial No. 65,561, filed December 16, 1948, now Patent No. 2,587,240, I disclose mobile blower arrangements including means for introducing an insecticide into the air stream of the blower and with the blower arranged to oscillate in a vertical plane so that it can be moved along the trees in an orchard and the foliage of the trees sprayed from top to bottom. Arrangements of this nature are highly useful for maintaining orchards and offer desirable economies of time in carrying out the spraying, and likewise, produce results superior to what is obtainable according to prior art practices.

It has been found, however, that when a blower of this type is arranged to discharge air with sufficient velocity to reach the uppermost foliage of the trees to be sprayed, this velocity is in excess of what is needed when the blower is directed to the lower part of the trees and often the trees are damaged and blossoms or fruit blown therefrom at the lower parts of the trees.

With the foregoing in mind, the primary object of the present invention is to provide a blower arrangement of the nature referred to which will avoid this difficulty and which will, at one time, project air toward the top of a tree to be sprayed at high velocity and toward the bottom of the tree at a lower velocity.

Another object is the provision of a simple arrangement for accomplishing the above results which does not involve any substantial change in a conventional blower structure.

Oscillating blowers of the nature referred to are most useful when they are adapted for oscillating on either side of the vertical center line so that trees can be sprayed on either one side or the other.

Accordingly, a still further object of this invention is the provision of an improved arrangement for permitting oscillation of the blower on either side of a vertical center line.

A still further object is the provision of an improved and simplified arrangement for varying the degree of oscillation of the blower.

These and other objects and advantages will become more apparent upon reference to the following description taken in connection with the accompanying drawings in which:

Figure 1 is a perspective view of a portable sprayer-blower according to my invention;

Figure 2 is a transverse section indicated by the cutting plane 2—2—2 on Figure 1, and showing the general arrangement of the blower and the mechanism for causing it to oscillate;

Figure 3 is a plan view looking down on top of the blower of Figure 2, showing the drive to the blower, to the pump which provides the supply of material that is to be carried by the air stream from the blower, and the drive to the oscillating mechanism for the blower;

Figure 4 is a view like Figure 2, but showing the blower at approximately its other limit of travel;

Figure 5 is a sectional view indicated by line 5—5 on Figure 2 showing the construction of an adjustable crank arm forming a part of the oscillating mechanism;

Figure 6 is a fragmentary sectional view indicated by line 6—6 on Figure 2 showing another detail in connection with the oscillating mechanism for the blower;

Figure 7 is a sectional view indicated by line 7—7 on Figure 2 showing the journals by means of which the rotor of the blower and the blower casing are rotatably supported on the frame of the machine;

Figure 8 is a sectional view indicated by line 8—8 on Figure 3 showing the means by which the blower discharge velocity is adjusted and the actuating mechanism connected thereto;

Figure 9 is a diagrammatic view showing the preferred manner of drivingly interconnecting the rotor of the blower, the pump for supplying material to be sprayed, an agitator for the tank containing the said material, and the mechanism for oscillating the blower on its axis;

Figure 10 is a view like Figure 2, but showing the blower adjusted so it will oscillate on the opposite side of the vertical center line thereof;

Figure 11 is a diagrammatic view showing the blower as it appears spraying the lower part of a tree; and, Figure 12 shows the blower when it is tilted to spray the upper part of the tree.

Referring to the drawings somewhat more in detail, Figure 1 shows a portable spraying device, according to my invention, including an oscillating blower having means for varying the discharge velocity thereof. The machine illustrated in Figure 1 comprises a frame 10 supported on ground wheels 12 having an engine at one end in a compartment indicated at 14, and having a tank 16 intermediate the ends of the frame containing the material which is to be sprayed. At the end of the frame opposite the said motor there is mounted an oscillating blower generally indicated at 18.

The described arrangement of the blower, the motor, and the tank is of advantage inasmuch as it positions the heavy tank substantially over the axle connecting wheels 12 thereby making it relatively simple to support the tank and also preventing the machine from becoming badly unbalanced.

The blower 18 comprises the usual bladed rotor 20 mounted on a shaft 22 that extends through anti-friction bearings 24 mounted in bearing blocks 26 at opposite sides of the blower and which bearing blocks are supported on standards or brackets 28 rigidly connected with frame 10 of the machine and upstanding therefrom.

Blower 18 also comprises a housing 30, consisting of a scroll-like outer part surrounding bladed rotor 20 and including a substantially rectangular discharge opening 32. The side walls of the blower housing are apertured and receive a pair of generally circular cast members 34, the one of which disposed on the tank side of the blower is open in its center and supports the air inlet funnel 36. The other of the castings is blanked off, either during the casting thereof or by a suitable plate so that all of the air blown by the blower enters through the intake funnel 36.

The above mentioned castings 34 have radially inwardly projecting spokes 38 which terminate in the central annular bearing portions 40 which are rotatable on the bearings 42 supported on the bearing blocks 26 as by the bolts 44. This arrangement is illustrated in Figure 7, and substantially the same arrangement is provided at both sides of the blower so that the blower casing is rotatably supported on the axis of shaft 22.

One of the bearings 42 has a pad formed thereon at 46 (Figure 3) and pivoted to pad 46 is an arm 48. This arm 48, as will best be seen in Figures 2, 3 and 8, is also pivoted to an arm or link 50 which has its other end pivoted at 52 to a point inside casing 30 of the blower. Arm or link 50 includes an angularly projecting part 54 rigid therewith and which terminates in a bar portion 56 extending axially of the blower housing and adjacent the discharge opening 32 thereof.

Portion 56 has rigidly secured thereto a generally L-shaped baffle comprising a part 58 extending into the discharge opening of the blower and a part 60 extending along the outer wall of the casing. The baffle extends the width of the discharge opening of the casing and it will be apparent upon reference to Figure 8 that movement of part 58 of the baffle downwardly in the discharge opening will reduce the effective size of the discharge opening while the portion 60 of the baffle will form a continuation of the scroll-like outer wall of the casing thereby to prevent air from being blown between the top part of the discharge opening and the baffle.

It might be pointed out at this point that bar 56 is relatively close to the periphery of the rotor of the blower and thus supports the baffle member in a position where it is highly effective for preventing loss of efficiency of the blower due to the air circulating within the casing rather than being forced out through the discharge opening.

As mentioned before, the housing of the blower is arranged to oscillate about the axis of shaft 22 and this is accomplished by an arrangement which is best seen in Figures 2 and 3. Journaled on the frame of the machine is a shaft 62 which has welded to one end a block 64 receivable between the two legs 66 of a crank arm that carries a trunnion pin 68 at its opposite end. Bolts 70 are provided for clamping the crank arm to block 64 and a plurality of bolt receiving apertures 72 are provided in the crank arm for adjustment thereof on the said block.

Mounted on trunnion pin 68 by bearing 74 is an adjustable connecting rod 76 which has a bearing 78 at its other end receiving a trunnion pin carried on an arm 80 which is journaled on the one of the bearings 42 that is adjacent the inlet opening of the blower.

Arm 80 has pivoted thereto at 82 a toggle 84 including a spring 86 for snapping the toggle into its two positions and having the end portions 88 so positioned that they can be selectively made to engage the periphery of an axially extending flange 90 running about the adjacent casting 34. A part of the periphery of flange 90 is toothed as at 92 and the casting also includes stop elements 94 and 96 which will abut one side of arm 80 when the part 88 of the toggle on the opposite side of the arm is engaging one of the teeth 92. Reference to Figure 2 will serve to reveal that rotation of shaft 62 will cause oscillation of arm 80 about its pivotal support on bearing 42 and this, in turn, will cause oscillation of the housing of the blower from its Figure 2 position to its Figure 4 position.

Simultaneously, with the oscillation of the blower housing, the mechanism connected with the baffle disposed in the blower discharge opening will cause the said baffle to move in the opening. In Figure 2 it will be seen that the baffle is so positioned that it does not restrict the discharge opening of the blower, but as the blower casing moves toward its Figure 4 position, the baffle moves so as increasingly to restrict the said opening.

In this manner the velocity of the blower discharge is caused to vary between a pre-determined lower limit when the blower housing is in its Figure 2 position, and a pre-determined higher limit when the blower housing is in its Figure 4 position whereby a lower velocity discharge is directed toward the bottom of the foliage of the tree and a higher velocity discharge is directed toward the top of the tree.

The arrangement of this invention is such that no adjustments need be made in the mechanism when the blower is adjusted to oscillate on the opposite side of the center. This will be seen on reference to Figure 10 where the blower is adjusted to oscillate on the opposite side from Figure 2. This adjustment of the blower housing is accomplished by releasing toggle 84 and then turning the blower housing until arm 80 abuts stop element 96 and then again engaging the toggle with a tooth on the opposite side of the arm from the said stop element. Under these conditions of adjustment the blower will oscillate from its Figure 10 position upwardly to an upper limit and then back again. The baffle, as will be seen in Figure 10, is positioned so that it does not restrict the discharge opening of the blower when the discharge opening is in its lower position but will be adjusted upwardly so as increasingly to restrict the said discharge opening as the opening approaches its upper limit of travel.

The arrangement of the pivot 52 and the pivot pad 46 are influential in determining that the baffle will be properly positioned relative to the discharge opening at all times and it will be seen on reference to the drawings that the pivot 52 is substantially symmetrically located relative to the two positions of the discharge opening illustrated in Figures 2 and 10 while the pivot pad 46 is likewise positioned in a position symmetrical to these two locations of the discharge opening. By virtue of this arrangement no adjustment need ever be made in the actuating mechanism for the baffle.

For supplying the material to be sprayed to the air stream, there is provided a manifold 100 extending across the discharge opening of the blower and having mounted therein a plurality of nozzles 102. Manifold 100 is mounted by a flexible conduit 104 with a conduit 106 leading to the discharge side of a pump 108 connected to draw the material to be sprayed from tank 16.

Pump 108 is driven by a pulley 110 that is belted to pulley 112 mounted on shaft 22 of rotor 20. The drive shaft of the pump also mounts pulley means 114 that are belted to pulley means 116 on a shaft 118 that leads into tank 16 at a lower level thereof and carries within the tank an agitator for maintaining the material in the tank thoroughly mixed at all times.

On shaft 118 are still other pulley means 120 and these are belted to the pulley means 122 that are carried on shaft 62 of the mechanism for oscillating the blower casing.

Shaft 22 is coupled to a drive shaft 121 which extends through tank 16 and is connected for being driven by the motor in compartment 14. Shaft 121 is preferably housed within a sleeve 123 extending axially through tank 16 and rigidly secured to its opposite end walls. Sleeve 123 thus, at one time, provides a housing for shaft 121 and a stiffening brace for supporting the end walls of tank 16 against bending outwardly under load.

The relative positioning of the said shafts and the approximate relative sizes of the pulley means thereon are illustrated in Figure 9 of the drawings.

By way of example, Figures 11 and 12 illustrate the operation of the blower arrangement of this invention. In Figure 11 the blower is discharging horizontally toward the lower portion of tree 124 and the air blast 126 from the blower is spread over a relatively large area and is thus of a fairly lower velocity so that fruit and blossoms will not be knocked off the tree or the foliage damaged. At the same time, the velocity of the air blast is high enough to agitate the foliage of the tree so that all parts thereof are thoroughly sprayed.

In Figure 12 the discharge opening of the blower has been restricted by movement of the baffle member as the blower casing is tilted upwardly and the air blast 126 is therefore directed over a smaller area and moves at higher velocity. This higher velocity of the air blast, however, does not damage the tree or knock fruit or blossoms therefrom because it is directed to the upper portion of the tree rather than the much nearer lower portion thereof.

It will be seen that this invention provides for an arrangement wherein the discharge from the blower is continuously adjusted during tilting movements of the blower so as to have the most desirable velocity at all times for insuring a thorough spraying of the foliage being treated but without any damage being caused to the said foliage.

It will be understood that the blower is also adapted for use without oscillating the blower casing as, for example, when spraying bushes, ground crops, and small trees, but the oscillating blower arrangement with the baffle, according to my invention, finds its best use in connection with the spraying of trees in the manner illustrated in Figures 11 and 12.

It will be understood that this invention is susceptible to modification in order to adapt it to different usages and conditions, and, accordingly, it is desired to comprehend such modifications within this invention as may fall within the scope of the appended claims.

I claim:

1. A blower comprising; a rotor, a casing around the rotor having a discharge passage, means for tilting the casing on the axis of the rotor to vary the inclination of said passage, and means responsive to the said tilting means for varying the effective area of said passage.

2. A blower comprising; a rotor, a casing around the rotor having a peripheral discharge passage, means for tilting the casing on the axis of the rotor to vary the inclination of said passage, and means connected to said casing and responsive to the said tilting means for varying the effective area of said passage, said means being operable to decrease the effective area of the passage as the opening is elevated and to increase the effective area thereof as the passage is lowered.

3. A blower comprising a rotor mounted on a horizontal axis, a casing around the rotor having a tangential discharge passage, means for tilting the casing on the axis of the rotor to vary the inclination of said passage from a substantially horizontal position to a substantially vertical position, a baffle in the passage for variably restricting said passage, means connected to said casing and to said baffle and responsive to said tilting means for moving said baffle from a position of minimum restriction when said passage is substantially horizontal to a position of maximum restriction when said passage is substantially vertical and to proportionate positions of varying restriction when said passage is between said horizontal and vertical positions.

4. A blower comprising a rotor mounted on a horizontal axis, a casing around the rotor having a rectangular discharge channel extending tangentially therefrom, said channel having a pair of walls, means for tilting said casing to vary the inclination of said channel, a baffle in said channel for variably restricting said channel, and means connected to said baffle and to said casing and responsive to said tilting means for moving said baffle toward one of said walls as the channel is tilted from a first to a second position and toward the other of said walls when said channel is tilted to a third position or back to said first position.

5. A blower comprising a rotor mounted on a horizontal axis, a casing around the rotor having a rectangular discharge channel extending tangentially therefrom, said channel having a pair of walls, means for tilting said casing to vary the inclination of said channel, a baffle in said channel for variably restricting said channel, and means connected to said baffle and to said casing and responsive to said tilting means for moving said baffle toward one of said walls as the channel is tilted from a first to a second position and toward the other of said walls when said channel is tilted to a third position or back to said first position, said baffle being supported substantially parallel to said one wall of the channel at all times.

6. A blower comprising a rotor mounted on a horizontal axis, a casing around the rotor having a rectangular discharge channel extending tangentialy therefrom, said channel having a pair of spaced substantially parallel walls, means for rotating said channel through a vertical angle from one horizontal position whereby discharge occurs in one direction to a second horizontal position whereby discharge occurs in the opposite direction, a baffle in said channel substantially parallel to said walls for variably restricting said channel, and means connected to said baffle and to said casing and responsive to said rotating means for oscillating said baffle from a minimum restricting position adjacent one of said walls when said channel is in either horizontal position to a maximum restricting position intermediate said walls when said channel is in a substantially vertical position intermediate said horizontal positions.

7. A blower comprising a frame, a rotor mounted on said frame on a horizontal axis, a casing around the rotor tiltable about the axis and having a rectangular discharge channel extending tangentially therefrom, a baffle in said channel substantially parallel to one wall thereof, an articulated linkage connected to said casing and to a stationary point on said frame, said baffle being connected to said linkage whereby tilting of said casing will be accompanied by movement of said baffle in the same direction as said casing and in substantial parallelism with said one wall but at a different speed than said casing, and means for oscillating said casing on said axis.

8. A blower comprising a frame, a rotor mounted on said frame on a horizontal axis, a casing around the rotor tiltable about the axis and having a rectangular discharge channel extending tangentially therefrom, a baffle in said channel substantially parallel to one wall thereof, a pair of pivoted arms, one of said arms being connected to said casing, and the other of said arms being connected to a stationary point on said frame, said baffle being connected to said one arm whereby tilting of said casing will be accompanied by movement of said baffle in the same direction as said casing and in substantial parallelism with one of said walls but at a different speed than said casing, and means for oscillating said casing on said axis.

9. A blower comprising; a rotor mounted on a horizontal axis, a casing around the rotor tiltable about the axis and having a rectangular discharge channel extending tangentially therefrom, a baffle in said channel substantially parallel to one wall thereof, said baffle being substantially co-extensive with said one wall and having a portion extending at an angle thereto inside the casing so movement of the baffle to restrict the channel will be accompanied by a masking off of the space between the baffle and the wall of the channel which it effectively replaces, an arm fixed at one end to the baffle and pivoted at its other end to the inside of the casing, a second arm pivoted between a point on the first arm and a stationary point adjacent the axis of the rotor, and means for selectively oscillating said casing about said axis through a predetermined angle whereby said arms are operable to adjust the position of said baffle in said channel to vary the effective discharge area thereof as said casing is oscillated, said baffle being supported substantially parallel with said one wall at all times.

10. A blower comprising; a rotor mounted on a horizontal axis, a casing around the rotor tiltable about said axis and having a tangential discharge opening, a baffle in the opening movable for variably restricting said opening, and means for moving said casing and baffle in unison and relatively so that when the opening is horizontal the baffle is in a position of minimum restriction and when the opening is vertical the baffle is in a position of maximum restriction, and for every intermediate position of the opening, the baffle occupies a proportionate intermediate position, a manifold extending across said discharge opening having nozzles, said manifold being parallel to the plane of the baffle and being located in the portion of the discharge opening that is not cut off by the baffle, and means for supplying material to be sprayed to said manifold under pressure.

11. In an oscillating blower structure; a frame, bearing brackets on the frame defining a horizontal axis, a blower rotor having a shaft on said axis supported by bearings in said brackets, a casing around the rotor having a peripheral discharge opening and also journalled on said brackets so as to be tiltable about said axis, said casing having side walls and an annular rim on one of said side walls, an arm pivoted on one of said bearing brackets and extending axially adjacent said rim, means for connecting the arm to said rim at selected positions therearound, and means for oscillating said casing through selected arcs depending on the position of said arm on the rim.

12. A blower comprising a rotor mounted on a horizontal axis, a casing around the rotor having a rectangular discharge channel extending tangentially therefrom, said channel having a pair of spaced substantially parallel walls, means for rotating said channel through a vertical angle from one horizontal position whereby discharge occurs in one direction to a second horizontal position whereby discharge occurs in the opposite direction, a baffle in said channel substantially parallel to said walls for variably restricting said channel, and means connected to said baffle and to said casing and responsive to said rotating means for oscillating said baffle from a minimum restricting position adjacent one of said walls when said channel is in either horizontal position to a maximum restricting position intermediate said walls when said channel is in a substantially vertical position intermediate said horizontal positions, said baffle being supported substantially parallel to said walls at all times and a masking portion on said baffle adapted to extend between said baffle and said one wall when said baffle is in any of its restricting positions to close off air flow to the space between said baffle and said one wall.

13. In an oscillating blower structure; a frame, bearing brackets on the frame defining a horizontal axis, a blower rotor having a shaft on said axis supported by bearings in said brackets, a casing around the rotor having a peripheral discharge opening and also journalled on said brackets so as to be tiltable about said axis, said casing having side walls and an annular rim on one of said side walls, a plurality of teeth spaced around the periphery of said rim, an arm pivoted on one of said bearing brackets and extending axially adjacent said rim, means for connecting the arm to said rim at selected positions therearound comprising a toggle pivoted to said arm and having end portions extending transversely of said arm and engageable with said teeth, and means for oscillating said casing through selected arcs depending on the position of said arm on the rim.

14. In an oscillating blower structure; a frame, bearing brackets on the frame defining a horizontal axis, a blower rotor having a shaft on said axis supported by bearings in said brackets, a casing around the rotor having a peripheral discharge opening and also journalled on said brackets so as to be tiltable about said axis, said casing having side walls and an annular rim on one of said side walls, a plurality of teeth spaced around the periphery of said rim, an arm pivoted on one of said bearing brackets and extending axially adjacent said rim, means for connecting the arm to said rim at selected positions therearound comprising a toggle pivoted to said arm and having end portions extending transversely of said arm and engageable with said teeth, and means for oscillating said casing through selected arcs depending on the position of said arm on the rim, including means for limiting the maximum angle through which said casing may be tilted, comprising stop means at each end of said rim for abutting said arm.

References Cited in the file of this patent

UNITED STATES PATENTS

| Number | Name | Date |
| --- | --- | --- |
| 680,280 | Roesser | Aug. 13, 1901 |
| 960,815 | Carlisle | June 7, 1910 |
| 1,326,155 | Russell et al. | Dec. 23, 1919 |
| 1,669,581 | Spencer | May 15, 1928 |
| 2,116,539 | Payne et al. | May 10, 1938 |
| 2,429,374 | Shade | Oct. 21, 1947 |
| 2,515,792 | Ofeldt | July 18, 1950 |
| 2,583,753 | Spreng et al. | Jan. 29, 1952 |
| 2,587,240 | Spreng | Feb. 26, 1952 |

FOREIGN PATENTS

| Number | Country | Date |
| --- | --- | --- |
| 588,592 | Great Britain | May 28, 1947 |